United States Patent
Chen et al.

(10) Patent No.: US 10,462,459 B2
(45) Date of Patent: Oct. 29, 2019

(54) NON-LOCAL ADAPTIVE LOOP FILTER

(71) Applicant: MEDIATEK INC., Hsinchu (TW)

(72) Inventors: Ching-Yeh Chen, Taipei (TW);
Jian-Liang Lin, Su'ao Township (TW);
Tzu-Der Chuang, Zhubei (TW);
Yu-Wen Huang, Taipei (TW)

(73) Assignee: MEDIATEK INC., Hsinchu (TW)

(*) Notice: Subject to any disclaimer, the term of this patent is extended or adjusted under 35 U.S.C. 154(b) by 15 days.

(21) Appl. No.: 15/485,694

(22) Filed: Apr. 12, 2017

(65) Prior Publication Data

US 2017/0302929 A1 Oct. 19, 2017

Related U.S. Application Data

(60) Provisional application No. 62/326,030, filed on Apr. 22, 2016, provisional application No. 62/322,308, filed on Apr. 14, 2016.

(51) Int. Cl.
*H04N 19/117* (2014.01)
*H04N 19/80* (2014.01)
(Continued)

(52) U.S. Cl.
CPC ......... *H04N 19/117* (2014.11); *H04N 19/107* (2014.11); *H04N 19/126* (2014.11);
(Continued)

(58) Field of Classification Search
None
See application file for complete search history.

(56) References Cited

U.S. PATENT DOCUMENTS 5,715,334 A * 2/1998 Peters ............... G06T 5/50
382/130
6,363,116 B1 * 3/2002 Edwards ............. H04N 17/00
348/E17.003
(Continued)

FOREIGN PATENT DOCUMENTS

| CN | 101505427 A | 8/2009 |
| CN | 102804776 A | 11/2012 |
| CN | 102986224 A | 3/2013 |

OTHER PUBLICATIONS

Buades, B. Coll, and J. M. Morel, "A non-local algorithm for image denoising," in IEEE Computer Society Conference on Computer Vision and Pattern Recognition, 2005. CVPR 2005, vol. 2, Jun. 2005, pp. 60-65 vol. 2.
(Continued)

*Primary Examiner* — Frederick D Bailey
(74) *Attorney, Agent, or Firm* — Oblon, McClelland, Maier & Neustadt, L.L.P.

(57) ABSTRACT

Aspects of the disclosure provide a method for denoising a reconstructed picture. The method can include receiving reconstructed video data corresponding to a picture, dividing the picture into current patches, forming patch groups each including a current patch and a number of reference patches that are similar to the current patch, denoising the patch groups to modify pixel values of the patch groups to create a filtered picture, and generating a reference picture based on the filtered picture for encoding or decoding a picture. The operation of denoising the patch groups includes deriving a variance of compression noise in the respective patch group based on a compression noise model. A selection of model parameters is determined based on coding unit level information.

23 Claims, 9 Drawing Sheets

(51) Int. Cl.

| | | |
|---|---|---|
| *H04N 19/176* | (2014.01) | |
| *H04N 19/107* | (2014.01) | |
| *H04N 19/139* | (2014.01) | |
| *H04N 19/126* | (2014.01) | |
| *H04N 19/86* | (2014.01) | |
| *H04N 19/186* | (2014.01) | |
| *H04N 19/157* | (2014.01) | |
| *H04N 19/82* | (2014.01) | |

(52) U.S. Cl.
CPC ......... *H04N 19/139* (2014.11); *H04N 19/157* (2014.11); *H04N 19/176* (2014.11); *H04N 19/186* (2014.11); *H04N 19/80* (2014.11); *H04N 19/82* (2014.11); *H04N 19/86* (2014.11)

(56) References Cited

U.S. PATENT DOCUMENTS

| | | | |
|---|---|---|---|
| 9,154,778 B2 | 10/2015 | Fu et al. | |
| 9,406,138 B1* | 8/2016 | St-Pierre | G06T 7/181 |
| 9,615,093 B2 | 4/2017 | Fu et al. | |
| 2004/0233222 A1* | 11/2004 | Lee | G06F 3/0481 |
| | | | 345/621 |
| 2005/0019000 A1* | 1/2005 | Lim | G06T 3/4069 |
| | | | 386/209 |
| 2005/0041740 A1* | 2/2005 | Sekiguchi | H04N 19/139 |
| | | | 375/240.16 |
| 2007/0121728 A1* | 5/2007 | Wang | H04N 19/563 |
| | | | 375/240.18 |
| 2007/0153892 A1* | 7/2007 | Yin | H04N 19/176 |
| | | | 375/240.03 |
| 2007/0217705 A1* | 9/2007 | Lee | H04N 19/86 |
| | | | 382/251 |
| 2008/0019597 A1* | 1/2008 | Song | H04N 19/105 |
| | | | 382/233 |
| 2008/0123981 A1* | 5/2008 | Moon | H04N 19/172 |
| | | | 382/246 |
| 2008/0170615 A1* | 7/2008 | Sekiguchi | H04N 19/70 |
| | | | 375/240.14 |
| 2011/0274158 A1 | 11/2011 | Fu et al. | |
| 2012/0082241 A1 | 4/2012 | Tsai et al. | |
| 2012/0082244 A1 | 4/2012 | Chen et al. | |
| 2012/0236941 A1* | 9/2012 | Lin | H04N 19/513 |
| | | | 375/240.16 |
| 2012/0294353 A1 | 11/2012 | Fu et al. | |
| 2013/0215959 A1 | 8/2013 | Chen et al. | |
| 2013/0259117 A1 | 10/2013 | Fu et al. | |
| 2014/0146890 A1 | 5/2014 | Chiu et al. | |
| 2015/0350648 A1 | 12/2015 | Fu et al. | |
| 2016/0156938 A1 | 6/2016 | Fu et al. | |
| 2016/0366437 A1* | 12/2016 | Zhou | H04N 19/593 |
| 2017/0013275 A1* | 1/2017 | Liu | H04N 19/176 |

OTHER PUBLICATIONS

K. Dabov, A. Foi, V. Katkovnik, and K. Egiazarian, "Image denoising by sparse 3-D transform-domain collaborative filtering," IEEE Trans. Image Process., vol. 16, No. 8, pp. 2080-2094, Aug. 2007.
Q. Guo, C. Zhang, Y. Zhang, and H. Liu, "An Efficient SVD-Based Method for Image Denoising," IEEE Transactions on Circuits and Systems for Video Technology, vol. PP, No. 99, pp. 1-1, 2015.
Xinfeng Zhang, Ruiqin Xiong, Weisi Lin, Jian Zhang, Shiqi Wang, Siwei Ma and Wen Gao, "Low-Rank Based Nonlocal Adaptive Loop Filter for High Efficiency Video Compression" IEEE Transactions on Circuits and Systems for Video Technology (Accepted), 2016, 1-12pp.
International Search Report dated and Written Opinion dated Jun. 29, 2017 in PCT/CN2017/080518 (submitting English translation only).

* cited by examiner

NON-LOCAL ADAPTIVE LOOP FILTER

INCORPORATION BY REFERENCE

This present disclosure claims the benefit of U.S. Provisional Application No. 62/322,308, "Searching Methods for Non-local Adaptive In-loop Filters in Video Coding" filed on Apr. 14, 2016, and U.S. Provisional Application No. 62/326,030, "Non-local Adaptive Loop Filters (NL-ALF) and larger CU improvement" filed on Apr. 22, 2016, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Block-based motion compensation, transform, and quantization are broadly employed for video compression to improve performance of video communication systems. However, due to coarse quantization and motion compensation, compression noise can be introduced which causes artifacts, such as blocking, ringing, and blurring in reconstructed pictures. In-loop filters can be employed to reduce the compression noise, which can not only improve quality of decoded pictures, but also provide high quality reference pictures for succeeding pictures to save coding bits. A non-local adaptive loop filter is one type of such in-loop filter.

SUMMARY

Aspects of the disclosure provide a method for denoising a reconstructed picture. The method can include receiving reconstructed video data corresponding to a picture, dividing the picture into current patches, forming patch groups each including a current patch and a number of reference patches that are similar to the current patch, denoising the patch groups to modify pixel values of the patch groups to create a filtered picture, and generating a reference picture based on the filtered picture for encoding or decoding a picture. The operation of denoising the patch groups includes deriving a variance of compression noise in the respective patch group based on a compression noise model. A selection of model parameters is determined based on coding unit level information.

In one example, the coding unit level information can include one or a combination of a quantization parameter (QP) of a coding unit associated with the respective current patch in the respective patch group, and a prediction type of the coding unit associated with the respective current patch in the respective patch group.

In another example, the coding unit level information can further include one or more QPs of predictions of the coding unit. When there is a non-zero residue in the coding unit, the QP of the coding unit is used to determine the model parameters, while when there is no residue in the coding unit, an average between the QP of the coding unit and the one or more QPs of the predictions of the coding unit is used to determine the model parameters.

In one embodiment, applying the denoising technology can include calculating a weighting factor for each reference patch based on a similarity between each reference patch and the current patch. The weighting factors of each reference patch can be derived based on an expression, $e^{-(SSE/Var)}$, where SSE represents an average of a sum of square error between the current patch and the respective patch, and Var represents the variance of compression noise in the respective patch group. Piece-wise linear interpolation can be used to approximate a value of the expression, $e^{-(SSE/Var)}$, for calculating the respective weighting factor.

In one embodiment, a standard deviation (SD) of compression noise in the respective patch group is a function of a SD of pixel values of the respective patch group in the compression noise model, and the function is represented as a polynomial function. A clipping operation can be applied on the SD of compression noise in the respective patch group or the SD of pixel values of the respective patch group to guarantee a monotonic increase property of the polynomial function.

Aspects of the disclosure provide a method for searching for similar patches to form a patch group. The method can include receiving reconstructed video data corresponding to a picture, dividing the picture into current patches, and searching for K similar reference patches in the picture for a current patch to form a patch group including the K similar reference patches and the current patch. The operation of searching for the K similar reference patches can include performing a first search process using a first searching strategy to obtain K similar patches included in a candidate list, and performing a second search process using a second searching strategy to update the candidate list.

In one embodiment, performing a first search process using a first searching strategy to obtain the K similar patches can include traversing candidate reference patches by performing the first searching strategy, including the first K traversed candidate reference patches in the candidate list while performing the first searching strategy, and including a traversed candidate reference patch that is more similar to the current patch than a member of the candidate list to the candidate list.

In one embodiment, performing a second search process using a second searching strategy to update the candidate list includes traversing candidate reference patches by performing the second searching strategy, and including a traversed candidate reference patch that is more similar to the current patch than a member of the candidate list to the candidate list.

In one example, the first searching strategy is different from the second searching strategy. In various examples, the first or second searching strategy employs one of full search, three step search, diamond search, four step search, hexagon-based search, or 2-dimensional-log search. In one example, an initial candidate reference patch of the first search process is different from, or the same as an initial candidate reference patch of the second search process. In one example, an initial candidate reference patch of the second search process is one of the candidate reference patches traversed by the first search process.

In one embodiment, the first or second search process can include searching for the K similar reference patches in a search window defined for the respective current patch on a search grid. The search window can have a first search region that is centered at a position of the respective current patch and that is concentrically surrounded by at least one other non-overlapping search region. In addition, a search region located farther away from the position of the respective current patch has a lower subsample ratio. In one example, each search region is of a rectangular shape.

In one example, searching for the K similar reference patches further includes terminating derivation of a first similarity measure of a candidate reference patch when the partially derived first similarity measure of the candidate reference patch is greater than a threshold. The threshold can equal to a second similarity measure of one of K previously-found similar reference patches multiplied by a control parameter.

In one embodiment, the first search process is performed in a first search region centered at a position of the current patch on a search grid, and the second search process is performed in a second search region concentric with the first search region. The second search region includes the first search region and the first and second search regions have different subsample ratios.

In another embodiment, the first search process is performed in a first search region centered at a position of the current patch on a search grid, and the second search process is performed in a second search region concentric with the first search region. However, the second search region surrounds the first search region and the first and second search regions have different subsample ratios.

In one embodiment, searching for the K similar reference patches can further include performing a refined search in a region around a position of a reference patch on the updated candidate list. In one example, a number of search processes including at least the first and second search processes for searching for the K similar reference patches and corresponding search strategies are predefined, or signaled at sequence level, picture level, slice level, or block level.

Aspects of the disclosure provide a method for reusing search results of a first color component for a second color component. The method can include receiving reconstructed video data corresponding to a picture having a first color component and a second color component, dividing pixels of the first color component in the picture into first current patches, dividing pixels of the second color component in the picture into second current patches, searching for similar first reference patches in the picture for a respective first current patch to form first patch groups corresponding to the first current patches, and using motion vectors of the similar first reference patches of the respective first current patch to search for similar second reference patches in the picture for a respective second current patch.

In one embodiment, the first and second color components have a same sampling ratio, and each first current patch corresponds to one of the second current patches. Accordingly, in one example, the motion vectors of the similar first reference patches of the respective first current patch are used as motion vectors of the similar second reference patches of the corresponding second current patch. In another example, a refined search on a search region surrounding a position of one of the similar first reference patches of the respective first current patch is performed to determine one of the similar second reference patches of the corresponding second current patch.

In another embodiment, the first color component and the second color component have different sampling ratios, and each first current patch corresponds to one of the second current patches. Accordingly, a scaling operation according to the different sampling ratios is performed to the motion vectors of the similar first reference patches of the respective first current patch to obtain scaled motion vectors. In one example, the scaled motion vectors is used as motion vectors of the similar second reference patches of the corresponding second current patch. In another example, a refined search on a search region surrounding a position indicated by one of the scaled motion vectors is performed to determine one of the similar second reference patches of the corresponding second current patch.

In a further embodiment, the first color component and the second color component have different sampling ratios, and each second current patch corresponds to multiple first current patches. Accordingly, a scaling operation according to the different sampling ratios is performed to the motion vectors of the similar first reference patches of each of the corresponding multiple first current patches to obtain scaled motion vectors. The similar second reference patches are subsequently searched for from candidate second reference patches indicated by the scaled motion vectors.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
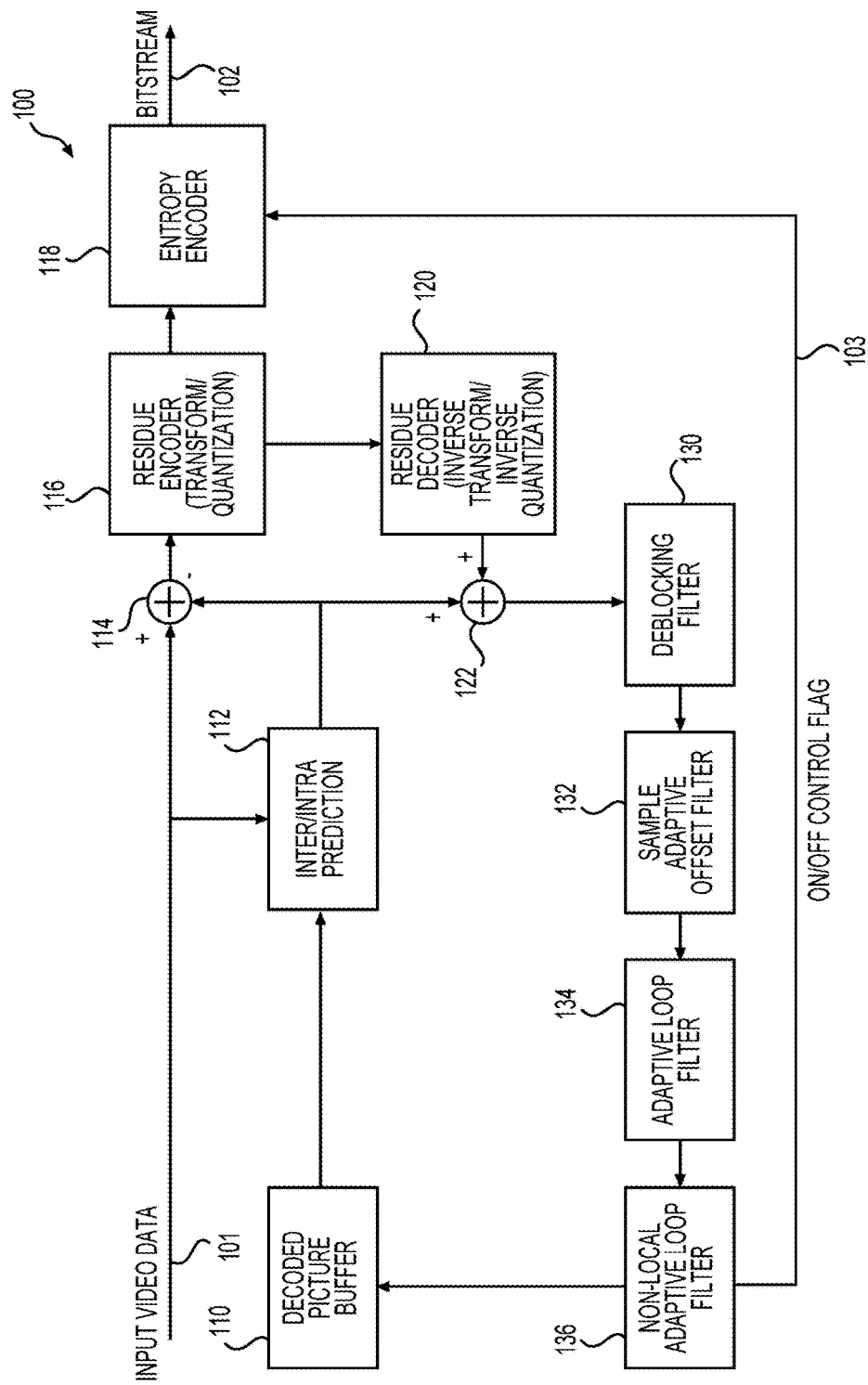
FIG. 1 shows an encoder according to an embodiment of the disclosure.

FIG. 1 shows an encoder 100 according to an embodiment of the disclosure. The encoder 100 can include a decoded picture buffer 110, an inter-intra prediction module 112, a first adder 114, a residue encoder 116, an entropy encoder 118, a residue decoder 120, a second adder 122, and one or more in-loop filters, such as a deblocking filter (DF) 130, a sample adaptive offset filter (SAO) 132, an adaptive loop filter (ALF) 134, and a non-local adaptive loop filter (NL-ALF) 136. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standards, High Efficiency Video Coding (HEVC) standards, and the like.

According to an aspect of the disclosure, the NL-ALF 136 can employ non-local denoising techniques to improve the performance of the encoder 100. Specifically, in one example, the NL-ALF 136 can divide a reconstructed picture into a plurality of patches (referred to as current patches). For each current patch, the NL-ALF 136 searches for similar patches (referred to as reference patches) in the reconstructed picture to form a patch group. Subsequently, the NL-ALF 136 can apply a denoising technology to each patch group to modify pixel values of one or more patches in respective patch group to reduce compression noise in those patches. The modified pixel values are returned to the picture to form a filtered picture.

In addition, according to an aspect of the disclosure, it cannot be guaranteed that a processed pixel in the filtered picture is better in terms of noise level than a corresponding original pixel in the reconstructed picture. Accordingly, the NL-ALF 136 can adaptively determine for different blocks (regions) in the picture whether a block would adopt the processed pixel values or retain the original pixel values of the reconstructed video data. An on/off control flag can be employed for signaling the adaptive adoption of the processed pixel values in a respective block.

In FIG. 1, the decoded picture buffer 110 stores reference pictures for motion estimation and motion compensation performed at the inter-intra prediction module 112. The inter-intra prediction module 112 performs inter picture prediction or intra picture prediction to determine a prediction (or, a predictor) for a block of a current picture during the video compression process. A current picture refers to a picture in the input video data 101 that is being processed in the inter-intra prediction module 112. The current picture can be divided into multiple blocks with a same or different size for the inter or intra prediction operations.

In one example, the inter-intra prediction module 112 processes a block using either inter picture coding techniques or intra picture coding techniques. Accordingly, a block encoded using inter picture coding is referred to as an inter coded block, while a block encoded using intra picture coding is referred to as an intra coded block. The inter picture coding techniques use the reference pictures to obtain a prediction of a currently being processed block (referred to as a current block). For example, when encoding a current block with inter picture coding techniques, motion estimation can be performed to search for a matched region in the reference pictures. The matched region is used as a prediction of the current block. In contrast, the intra picture coding techniques employ neighboring blocks of a current block to generate a prediction of the current block. The neighboring blocks and the current block are within a same picture. The predictions of blocks are provided to the first and second adders 114 and 122.

The first adder 114 receives a prediction of a block from the inter-intra prediction module 112 and original pixels of the block from the input video data 101. The adder 114 then subtracts the prediction from the original pixel values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), wavelet transform, and the like, to received residues corresponding to a transform block and generate transform coefficients of the transform block. Partition of a picture into transform blocks can be the same as or different from partition of the picture into prediction blocks for inter-intra prediction processing.

Subsequently, the residue encoder 116 can quantize the coefficients to compress the residues. The quantization can be controlled with a quantization parameter (QP). A QP indicates a step size for associating the transform coefficients with a finite set of steps. A larger QP value represents bigger steps that crudely approximate the transform such that most of signals in the transform block can be captured by fewer coefficients. In contrast, a smaller QP value can more accurately approximate the transform, however, at a cost of increased bit number for encoding the residues. Accordingly, a larger QP can induce more distortion or compression noise into a picture resulted from the video compression process. The compressed residues (quantized transform coefficients) are transmitted to the residue decoder 120 and the entropy encoder 118.

The residue decoder 120 receives the compressed residues and performs an inverse process of the quantization and transformation operations performed at the residue encoder 116 to reconstruct residues of a transform block. Due to the quantization operation, the reconstructed residues are similar to the original resides generated from the adder 114 but typically are not the same as the original version.

The second adder 122 receives predictions of blocks from the inter-intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then be transferred to the DF 130.

In one example, the DF 130 applies a set of low-pass filters to block boundaries to reduce blocking artifacts. The filters can be applied based on characteristics of reconstructed samples on both sides of block boundaries in a reconstructed picture as well as prediction parameters (coding modes or motion vectors) determined at the inter-intra prediction module 112. The deblocked reconstructed video data can then be provided to the SAO 132. In one example, the SAO 132 receives the deblocked reconstructed video data and categorizes pixels in the reconstructed video data into groups. The SAO 132 can then determine an intensity shift (offset value) for each group to compensate intensity shifts of each group. The shifted reconstructed video data can then be provided from the SAO to the ALF 134. In one example, the ALF 134 is configured to apply a filter to reconstructed video data across multiple pictures to reduce coding artifacts in the temporal domain. For example, the ALF 134 selects a filter from a set of filter candidates and applies the elected filter to a region of the reconstructed video data. In addition, the ALF 134 can be selectively turned on or off for each block of the reconstructed video data. The processed reconstructed video data can then be transmitted to the NL-ALF 136.

As described above, the NL-ALF 136 can process the received reconstructed video data using non-local denoising techniques to reduce compression noise in the reconstructed video data. In addition, the NL-ALF 136 can determine whether the non-local adaptive filtering is applied for a block in a denoised picture. For example, the NL-ALF 136 processes the received reconstructed video data and generates filtered video data. The NL-ALF 136 can then compare a filtered block of the filtered video data with a corresponding block of the received reconstructed video data to determine whether a distortion of the filtered block with respect to an original picture has been improved. When the distortion of the filtered block is improved, the pixel values of this filtered block can be adopted for forming the denoised picture. Otherwise, the pixel values of the corresponding block of the received reconstructed video data are adopted in the denoised picture. Accordingly, the denoised picture can be constructed based on the decision of whether to adopt filtered pixel values for a respective block in the denoised picture. The denoised picture can then be stored to the decoded picture buffer 110.

An on/off control flag can be employed to signal the above decision for the respective block to a decoder such that the decoder can process the block in the same way. As shown in FIG. 1, on/off control flags 103 indicating whether non-local adaptive loop filtering is applied to respective blocks are transmitted to the entropy encoder 118 in one example.

The entropy encoder 118 receives the compressed residues from the residue encoder 116 and on/off control flags 103 from the NL-ALF 136. The entropy encoder 118 may also receive other parameters and/or control information, such as intra prediction mode information, motion information, quantization parameters, and the like. The entropy encoder 118 encodes the received parameters or other information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
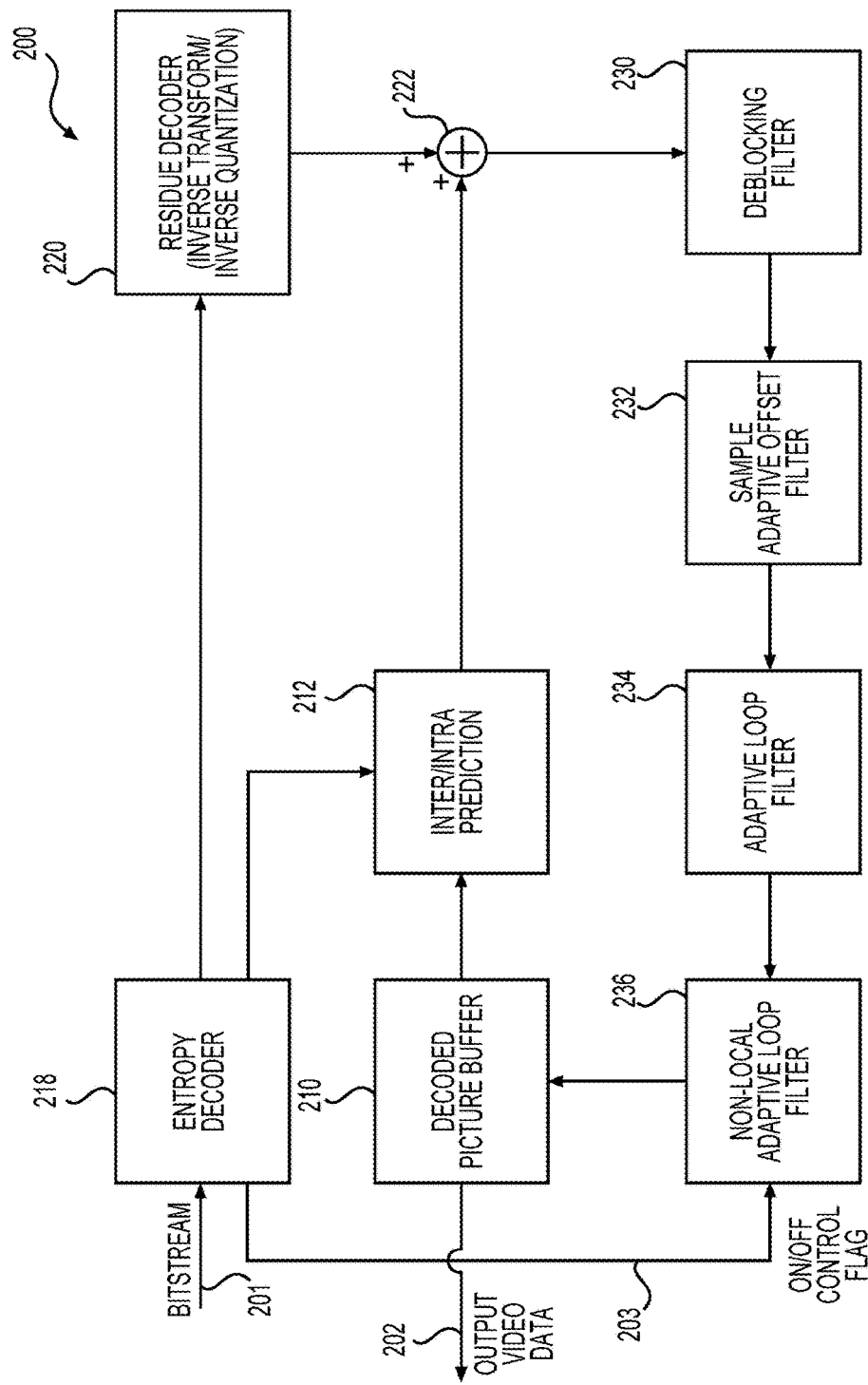
FIG. 2 shows a decoder according to an embodiment of the disclosure.

FIG. 2 shows a decoder 200 according to an embodiment of the disclosure. The decoder 200 includes an entropy decoder 218, a residue decoder 220, a decoded picture buffer 210, an inter-intra prediction module 212, an adder 222, and one or more in-loop filters, such as a DF 230, an SAO 232, an ALF 234, and a NL-ALF 236. Those components are coupled together as shown in FIG. 2. In one example, the decoder 200 receives a bitstream 201 from an encoder, such as the bitstream 102 from the encoder 100, and performs a decompression process to generate output video data 202. The output video data 202 can include a sequence of pictures that can be displayed, for example, on a display device, such as a monitor, a touch screen, and the like.

Similar to the encoder 100 in FIG. 1 example, the decoder 200 employs the NL-ALF 236, which has a similar function as the NL-ALF 136, to denoise a reconstructed picture to obtain a filtered picture. However, different from the NL-ALF 136 in FIG. 2 example, the NL-ALF 236 receives on/off control flags 203 from an encoder, and accordingly determines which blocks of pixel values in the filtered picture are to be included or excluded in a denoised picture. For example, when a control flag 203 of a block is in a state of on, filtered pixel values of the block in the filtered picture are adopted to the corresponding block of the denoised picture, while when a control flag 203 of a block is in a state of off, pixel values of the block of in the reconstructed picture are adopted.

The entropy decoder 218 receives the bitstream 201 and performs a decoding process which is an inverse process of the encoding process performed by the entropy encoder 118 in FIG. 1 example. As a result, compressed residues, prediction parameters, on/off control flags 203, and the like, are obtained. The compressed resides are provided to the residue decoder 220, and the prediction parameters are provided to the inter-intra prediction module 212. The inter-intra prediction module 212 generates predictions of blocks of a picture based on the received prediction parameters, and provides the predictions to the adder 222. The decoded picture buffer 210 stores reference pictures useful for motion compensation performed at the inter-intra prediction module. The reference pictures, for example, can be received from the NL-ALF 236. In addition, reference pictures are obtained from the decoded picture buffer 210 and included in the picture video data 202 for displaying to a display device.

The residue decoder 220, the adder 222, the DF 230, the SAO 232, and the ALF 234 are similar to the residue decoder 120, the second adder 122, the DF 130, the SAO 132, and the ALF 134 in terms of functions and structures. Description of those components is omitted.

The employment of a non-local adaptive loop filter, such as the NL-ALFs 136 and 236, in a decoder or encoder reduces a noise level in reconstructed video data, resulting in high quality output pictures. In addition, when those high quality pictures are used as reference pictures for encoding succeeding pictures, bit rate for transmission of the compressed pictures can be decreased. Therefore, denoising techniques disclosed herein for improving performance of a NL-ALF can improve performance and capability of a decoder or encoder which includes the NL-ALF.

While the FIG. 1 and FIG. 2 examples show a series of filters 130, 132, and 134, or 230, 232, and 234, that are included in the encoder 100 or decoder 200, it should be understood that none or fewer of such filters can be included in an encoder or decoder in other embodiments. In addition, the position of the NL-ALF 136 or 236 with respect to other filters can be different from what is shown in the FIG. 1 or FIG. 2 examples. For example, the NL-ALF 136 can be arranged in front of other filters so that it is directly coupled to the adder 122, or at the end of the series of filters, or among the series of filters.

In various embodiments, the NL-ALFs 136 and 236 can be implemented with hardware, software, or combination thereof. For example, the NL-ALF 136 or 236 can be implemented with one or more integrated circuits (ICs), such as an application specific integrated circuit (ASIC), field programmable gate array (FPGA), and the like. For another example, the NL-ALF 136 or 236 can be implemented as software or firmware including instructions stored in a computer readable non-volatile storage media. The instructions, when executed by a processing circuit, causing the processing circuit to perform functions of the NL-ALF 136 or 236.

It is noted that the NL-ALFs 136 and 236 implementing the denoising techniques disclosed herein can be included in other decoders or encoders that may have similar or different structures from what is shown in FIG. 1 or FIG. 2. In addition, the encoder 100 and decoder 200 can be included in a same device, or separate devices in various examples.

Figure 3:
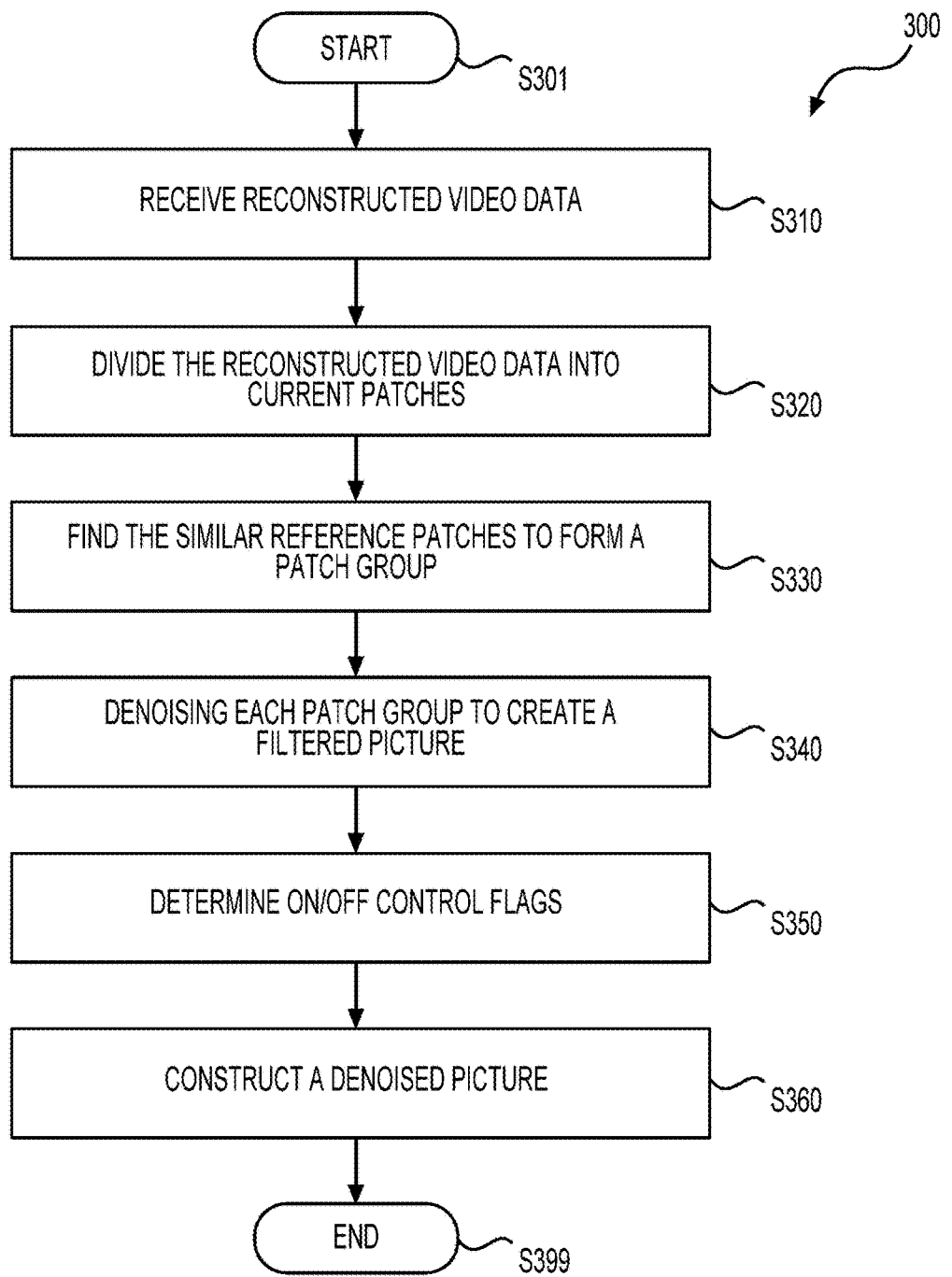
FIG. 3 shows a process for denoising a reconstructed picture according to an embodiment of the disclosure.

FIG. 3 shows a process 300 for denoising a reconstructed picture according to an embodiment of the disclosure. The process 300 can be performed at the NL-ALF 136 or 236 in the FIG. 1 or FIG. 2 example, and the FIG. 1 example is used to explain the process 300.

The process 300 starts from S301 and proceeds to S310. At S310, reconstructed video data is received at the NL-ALF 136. For example, the second adder 122 receives predictions from the inter-intra prediction module 122, and residues from the residue decoder 120, and combines the predictions and residues to generate reconstructed video data. In various embodiments of the process 300, the reconstructed video data can correspond to a picture, a frame, a slice of a picture, or a predefined region of a picture. Accordingly, a picture or a reconstructed picture corresponding to the reconstructed video data, can be used for reference to a picture, a frame, a slice of a picture, or a predefined region of a picture, and the like, in this disclosure. In addition, a filtered picture, or a denoised picture resultant from a picture corresponding to reconstructed video data can accordingly be used for reference to a picture, a frame, a slice of a picture, or a predefined region of a picture, and the like in this disclosure. Depending on a number of in-loop filters employed and a position of the NL-ALF 136 among those in-loop filters, the reconstructed video data can correspond to reconstructed video data generated from the residue decoder 120, or filtered reconstructed video data generated from a filter adjacent and previous to the NL-ALF 136.

At S320, the received reconstructed video data (corresponding to the reconstructed picture) is divided into a plurality of patches. In one example, the patches have a same size and shape, and are non-overlapped with each other. In other examples, the patches may have different sizes or shapes. In further examples, the patches may overlap with each other. Each patch includes a plurality of pixels, and is referred to as a current patch.

At S330, for each current patch, a plurality of similar patches (referred to as reference patches) are found in the reconstructed picture, or in some examples, in a search window within the reconstructed picture. In one example, each reference patch has a similar shape and size as the respective current patch. In addition, the reference patches can overlap each other, and the reference patches and the respective current patch can overlap each other. Each current patch and the respective similar reference patches form a patch group. In one example, for each current patch, the K most similar patches are found, and the current patch and the respective K most similar patches form a patch group including K+1 patches. K indicates a number of similar patches corresponding to a current patch, and K can have different values for different current patches or patch groups. In one example, similar matches found for a respective current patch are not the most similar reference patches but reference patches having a similarity measure above a threshold. The similarity measure can be obtained based on a similarity metric. In one example, patch groups are formed for a portion of the current patches instead of for each current patch.

In various embodiments, various search methods can be used to search for the K most similar reference patches for a respective current patch. In addition, in various embodiments, various similarity metrics can be used to measure the similarity between a current patch and a reference patch. For example, the similarity metric can be a sum of absolute differences (SAD), or a sum of square differences (SSD), between corresponding pixel values in a current patch and a corresponding reference patch. For another example, pixel values in a current patch and a corresponding reference patch can be arranged as two vectors, and a L2 norm distance between those two vectors can be used as a similarity metric.

At S340, a denoising technology is applied to each patch group to modify pixel values of one or more patches in the respective patch group. The modified pixel values of different patches either belonging to a same patch group or different patch groups are then aggregated to form a filtered picture, for example, by operations of weighted sum. In various embodiments, various denoising technologies can be employed to process the patch groups. For example, the denoising technology can be a non-local means (NLM) denoising technology, a block matching and 3D filtering (BM3D) denoising technology, or a low-rank approximation (LRA) denoising technology. However, the denoising technology applicable for processing the patch groups are not limited to the NLM, BM3D, or LRA technologies.

At S350, on/off control flags associated with a control block in a denoised picture are determined in a manner as described above. The on/off control flags indicate whether the control block adopts filtered pixel values in the filtered picture or pixel values of the reconstructed picture corresponding to the received reconstructed video data. The on/off control flags can be signaled from an encoder to a decoder. In various embodiments, control blocks for control of whether to adopt filtered pixel values resultant from the denoising operations at S340 can be defined or partitioned in various ways. For example, a partition of the control blocks can be consistent with a partition of coding units defined in the HEVC standard. Or, a partition of the control blocks can be consistent with a block partition used in a filter, such as the DF 130, the SAO 132, or the ALF 134, for purpose of control a filtering operation. Alternatively, the control block partition can be determined according to noise characteristics of different regions in a picture. In various examples, the control block partition information can be signaled from an encoder to a decoder, derived at a decoder, or predefined as a default configuration at both an encoder and a decoder.

At S360, the denoised picture are constructed based on the on/off control flag decisions. For control blocks associated with an on flag, filtered pixel values resultant from the denoising operation as S340 are adopted for the respective control blocks, while for control blocks associated with an off flag, pixel values of the received reconstructed picture are adopted for the respective control blocks. Subsequently, a reference picture can be generated based on the denoised picture. For example, the denoised picture can be stored to the decoded picture buffer 110 to be used as a reference picture. Alternatively, depending on the position of the NL-ALF 136 among other in-loop filters, the denoised picture may first be processed by other in-loop filters before storing into the decoded picture buffer 110. The process 300 proceeds to S399, and terminates at S399.

Figure 4:
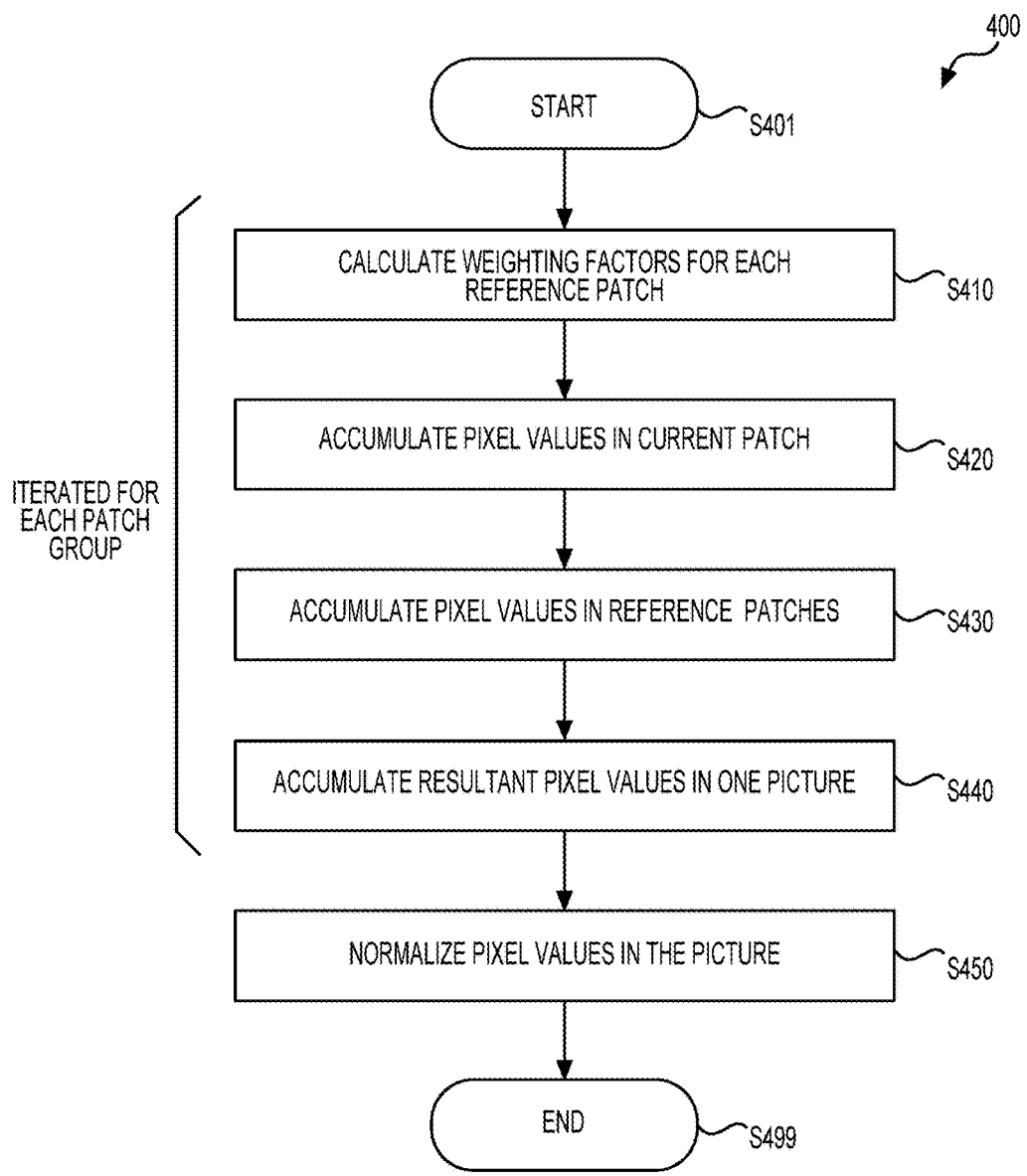
FIG. 4 shows an exemplary denoising process according to an embodiment of the disclosure.

FIG. 4 shows an exemplary process 400 of denoising according to an embodiment of the disclosure. The denoising in the process 400 can be one of the various denoising technologies employed at S340 in the process 300. Accordingly, the process 400 can be performed in place of S340 in the process 300 to obtain a denoised picture. Similarly, for other denoising technologies employed at S340, a process corresponding to the respective denoising technology can be performed in place of S340. The NL-ALF 136 is used as an example to explain the process 400.

The process 400 starts from S401 and proceeds to S410. Before initiation of the process 400, patch groups corresponding to reconstructed video data received at the NL-ALF 136 can have already been formed, for example, by performing the steps of S310-S330 in the process 300. The received reconstructed video data can correspond to a reconstructed picture or a portion of the reconstructed picture (such as a slice of the reconstructed picture). Assume the received reconstructed video data corresponds to a reconstructed picture below. The steps of S410-S440 are iterated for each patch group of the reconstructed picture. During the iteration, a patch group being processed in each round of the iteration is referred to as a current patch group.

At S410, weighting factors for each reference patch in a current patch group are calculated. The weighting factor of a reference patch can be calculated based on a similarity between the reference patch and a respective current patch in the current reference patch group. The more a reference patch is similar to the current patch, the larger the weighting factor of the reference patch. In one example, the weighting factors are determined using the following expression, $$w_{i,j}=e^{-(SSE/Var)}.$$

In the above expression, i and j are patch indexes, $w_{i,j}$ represents a weighting factor of a reference patch j with respect to the respective current patch i; SSE represents the average of sum of square errors between corresponding pixel values in the patches i and j, and indicates the similarity degree between the patches i and j; Var represents a variance of compression noise in the current patch group. For example, Var can equal to a square of a standard deviation (SD) of compression noise of the current patch group. Var can indicate strength of the filtering operation. The higher the compression noise level, the higher the Var, and the larger the corresponding weighting factors of the current patch group.

In the above example, the weighting factors of each reference patch are derived based on the expression, $e^{-(SSE/Var)}$. In order to reduce computational cost of calculation a weighting factor of a reference patch, piece-wise linear interpolation is used to approximate the value of the expression, $e^{-(SSE/Var)}$ in one example. For example, the values of (SSE/Var) at 6 control points are {0, 0.5, 1.0, 2.0, 4.0, 6.0} and the corresponding weighting factors are {1.0000, 0.6065, 0.3679, 0.1353, 0.0183, 0.0025}. Assuming a current value of (SSE/Var), $V_C$, has been obtained, two closest control points to the current value $V_C$ can be used to perform a linear interpolation (or extrapolation) to generate a corresponding weighting factor of (SSE/Var).

At S420, pixel values in the current patch are accumulated. In one example, the accumulation of the current patch pixel values is performed in a way that weighted pixel values of corresponding pixels in each reference patch are aggregated to corresponding pixel values of the current patch based on the respective weighting factors of each reference patch. In one example, the accumulation is performed according to the following expression, $$x_{Ai}(p)=x_i(p)+\Sigma_{j=1}^{K}w_{i,j}\cdot y_j(p),$$

where p is a pixel index, $x_{Ai}(p)$ represents an aggregated pixel value of the pixel, p, in the current patch i resultant from the aggregation, $x_i(p)$ represents an original pixel value of the pixel, p, in the current patch i before the aggregation, $y_j(p)$ represents an original pixel value of the pixel, p, in a reference patch j.

At S430, pixel values in each reference patch of the current patch group are accumulated. In one example, the accumulation of pixel values of a reference patch is performed in a way that a weighted pixel value of a corresponding pixel in the current patch are added to a corresponding pixel value of the reference patch based on the weighting factors of the reference patch. In one example, the accumulation is performed according to the following expression, $$y_{Aj}(p)=y_j(p)+w_{i,j}\cdot x_{Ai}(p),$$

where p is a pixel index, $y_{Aj}(p)$ represents an aggregated pixel value of the pixel, p, in a reference patch j resultant from the aggregation, $x_{Ai}(p)$ represents the aggregated pixel value of the pixel, p, in the current patch i resultant from the aggregation at S420, $y_j(p)$ represents an original pixel value of the pixel, p, in the reference patch j. In another embodiment, $x_i(p)$ in the current patch i is used in the above accumulation instead of $x_{Ai}(p)$.

At S440, the accumulated pixel values of the current patch and the reference patches resultant from S420 and S430 are accumulated to corresponding pixels in a picture, referred to as an accumulation picture. As the reference patches and the current patch in the current patch group can overlap each other, a pixel in the accumulation picture may receive pixel values from multiple patches, either the current patch or one or more reference patches. As the steps S410-S440 are performed for each patch group, at S440, accumulated pixel values of the respective current or reference patches of each round of the iteration can be accumulated to the accumulation picture. Accordingly, a pixel in the accumulation picture can receive accumulated pixel values from one or multiple patch groups. As an example, accumulated pixel values, $x_A(p)$, in the accumulation picture can be rewritten as $$x_A(p)=x_i(p)+\Sigma_{i=1}^{m}\Sigma_{j=1}^{K}w_{i,j}\cdot y_j(p),$$

where i is the index of patch groups in one picture, and there are total m patch groups in one picture.

At S450, accumulated pixel values in the accumulation picture are normalized to obtain a filtered picture. As a result of S440, an accumulated pixel in the final accumulation picture can include multiple portions of pixel values, and each of the portions corresponds to an original pixel value of either a current patch or a reference patch multiplied by a gain. Each gain corresponds to a weighting factor, or a product of one or more weighting factors. Accordingly, an accumulated pixel in the accumulation picture can be divided by a sum of those gains to obtain a normalized pixel value. Those normalized pixel values form the filtered picture. The process 400 proceeds to S499 and terminates at S499.

As an example, after performance of the process 400, the steps of S350 and S360 in process 300 can be performed to the filtered picture to determine the on/off control flag and construct a denoised picture.

In the denoising technology presented in the process 400, the variance of compression noise in a current patch group, Var, is used for calculating the respective weighting factors, as shown in the expression, $w_{i,j}=e^{-(SSE/Var)}$. According to an aspect of the disclosure, the Var is derived based on a compression noise model. In addition to the denoising technology presented in the process 400, a compression noise model can also be used in other denoising technologies for deriving a variance of compression noise in a patch group, such as the denoising technologies applied at S340 of the process 300 as described above. For example, a compression noise model can be used to derive a threshold for soft-thresholding or hard thresholding in the block matching and 3D filtering (BM3D) denoising technology or the low-ran approximation (LRA) denoising technology. Examples of compression noise models and usage of compression noise models are described below.

Generally, a compression noise model describes relationship between a compression noise level in a patch group and factors that affect the compression noise level. The factors can include characteristics of content of the patch group, coding types associated with the patch group (for example, coded by intra prediction or inter prediction), and transform quantization parameters (QPs) associated with the patch group. A compression noise model can be determined based on experiments.

In one example, a compression noise model used for various denoising technologies is formulated with a polynomial function. For example, the compression noise model takes the following form, $$y=ax^3+bx^2+cx+d,$$

where y represents a SD of compression noise of a patch group, which indicates a compression noise level of the patch group and a square of which equals the Var of the patch group; x represents a SD of pixel values of the patch group and indicates a characteristic of content of the respective patch group; and the parameters (coefficients), referred to as model parameters, a, b, c, and d, are constants. As an example, during a usage of the compression noise model, the constants, a, b, c, and d, can first be selected from multiple sets of model parameters based on coding type or QP associated with the respective patch group. Then, a SD of pixel values of the patch group, x, can be calculated. Finally, based on the obtained model parameters, a, b, c, and d, and the SD of pixel values of the patch group, x, a SD of compression noise of a patch group can be calculated.

In one example, the candidate sets of model parameters of the compression noise model are determined by conducting an experimental process. For example, common sequences of test pictures can be used in multiple coding processes at an encoder, such as the encoder 100. For each coding process, a set of picture coding type and transform QP can be configured for a sequence of pictures. Corresponding to each set of coding type and transform QP, compression noise and pixel values corresponding to different patch groups in a picture can be obtained. Accordingly, multiple data points of SDs of compression noise and pixel values corresponding to each patch group can be obtained. Based on the multiple data points, a set of model parameters (coefficients) of the compression noise model corresponding to the set of coding type and transform QP can be determined by a regression analysis to the data points. As a result of the above experimental process, multiple sets of model parameters of the compression noise model can be obtained each corresponding to a different set of coding type and transform QP. Table 1 below show an example of candidate sets of model parameters. As shown, a candidate set of model parameters is obtained for each pair of coding type and QP.

TABLE 1

Candidate Sets of Model Parameters

|  | QP 1 | QP 2 | QP 3 |
|---|---|---|---|
| Coding Type I | $\{a, b, c, d\}_1$ | $\{a, b, c, d\}_2$ | $\{a, b, c, d\}_3$ |
| Coding Type II | $\{a, b, c, d\}_4$ | $\{a, b, c, d\}_5$ | $\{a, b, c, d\}_6$ |

In a conventional denoising technology, a power function is used for formulating a compression noise model. In one such example, the compression noise model takes the form of a power function, $y=ax^b$, where y represents a SD of compression noise of a patch group, x represents a SD of pixel values of the patch group, and a and b are model parameters to be selected. According to an aspect of the disclosure, usage of a polynomial function, instead of a power function, to formulate a compression noise model can reduce computation complexity related with the compression noise model.

In one example, clipping operations are applied to the polynomial compression noise model in order to guarantee a monotonic increase property of the polynomial function. For example, a clipping operation can be added to a value of a SD of pixel values of a respective patch group, or a value of a SD of compression noise of the respective patch group resultant from the polynomial function.

In a conventional denoising technology, selection of model parameters of a compression noise model is based on picture or slice level information. For example, patch groups formed at steps of S310-S330 are included in a picture or a slice, and accordingly coding types and QPs defined at a picture level or a slice level are utilized to select model parameters of the compression noise model for each patch group without distinguishing different patch groups. However, according to an aspect of the disclosure, compression noise level varies for different regions in a picture according to prediction types, QPs, and predictions of respective regions. Accordingly, different set of model parameters of a compression noise model can be selected for patch groups distributed at different locations within a picture. As a result, variances or SDs of compression noise of different patch groups can be derived more accurately.

Accordingly, in one example, when selecting model parameters of a compression noise model, coding unit level information is utilized. A coding unit of an encoded picture can include coding data of collocated blocks of multiple color components (such as a luma component, two chroma components). For each color component, the coding unit can include one or more coding blocks and one or more transform blocks. As an example, a usage of coding unit is specified in the HEVC standard. In one example, coding unit level information includes a prediction type and a transform QP that are applied to respective coding blocks or transform blocks, respectively, in the respective coding unit.

In one example, a reconstructed picture or slice includes a plurality of coding units, and coding unit level information including a prediction type and a QP is associated with each respective coding unit. The prediction type information can be used for prediction operations, for example, at the inter-intra prediction module 112 in FIG. 1 and the QP information can be used for quantization operations, for example, at the residue encoder 116. When applying a denoising technology to a current patch group, for example, at S340 in process 300, and calculating a Var of compression noise of the current patch group for obtaining weighting factors, coding unit level information can be used to determine model parameters of a compression noise model. For example, a coding unit has a block (of one color component) that overlaps the current patch of the current patch group (of the same color component) (for example, a top-left pixel of the current patch is within the block of the coding unit), and a prediction type and QP of this coding unit are then used to select a set of model parameters of the compression noise model for the current patch group, for example, from the Table 1.

In addition, in the above example, for scenarios that the coding unit is coded with inter prediction, a state of residues corresponding to the coding unit is also considered for selection of the compression noise model parameters. For example, the QP of the coding unit is used for selection of the model parameters when there is a non-zero residue in the coding unit resultant from a prediction operation, while an average between the QP of the coding unit and one or more QPs of one or more predictions of coding blocks of the corresponding coding unit is used as the QP for selection of the model parameters when there is no residue in the coding unit. In one example, a QP of a prediction corresponding to a coding block in a coding unit is a QP of a coding unit that overlaps the prediction in a reference picture including the prediction. Or in another example, a QP of a prediction corresponding to a coding block in a coding unit is a QP in the slice header of a reference picture.

Figure 5A:
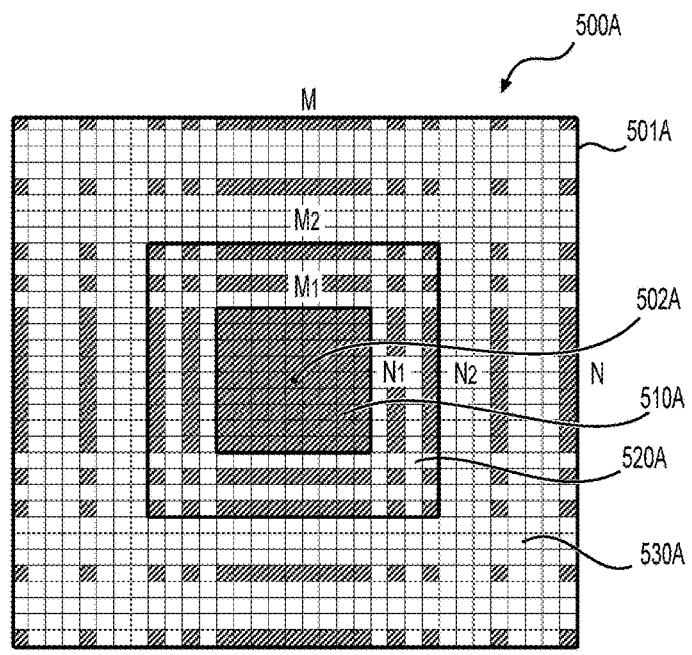
FIGS. 5A-5C show examples of search patterns 500A-500C according to an example of the disclosure.
Figure 5B:
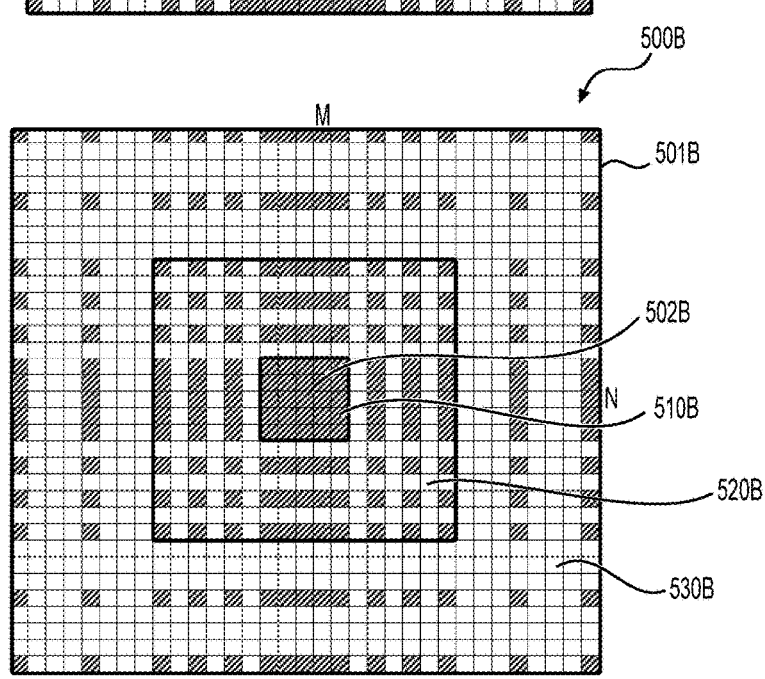
Figure 5C:
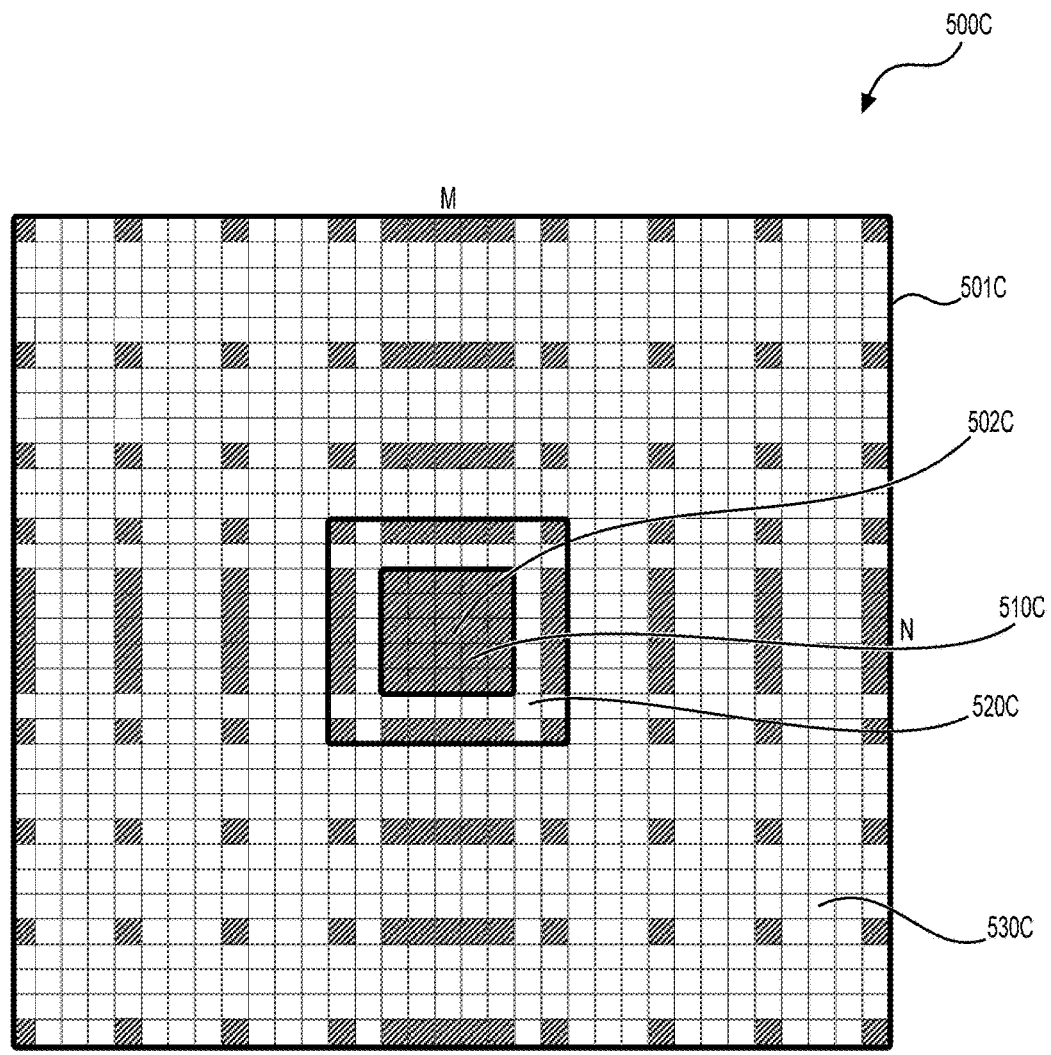

FIGS. 5A-5C show examples of search patterns 500A-500C according to an example of the disclosure. The search patterns 500A-500C can be used for searching for the K most similar reference patches to form a patch group during a denoising process, such as the processes 300. The search patterns 500A-500C each show a plurality of candidate positions (shaded cells) on a search grid 501A-501C. Each search grid 501A-501C corresponds to a search window 501A-501C in a reconstructed picture or slice. Each search grid 501A-501C includes positions (cells) of possible reference patches of a current patch. Each position (cell) in a search grid 501A-501C can correspond to a pixel of a reference or current patch, such as a top-left corner pixel in the patch.

Each search grid 501A-501C is centered at a central position 502A-502C, respectively, which represents a position of a current patch of a patch group. The candidate positions (shaded cell) in a search grid are a subset of all positions (cells) of the search grid, and each indicate a position of a candidate patch to be examined for selection of the K most similar reference patches for the current patch. A ratio of a number of candidate patch positions to a number of all positions in a region of a search grid is referred to as a subsample ratio of that region. Subsampling positions in an area of a search grid leads to fewer candidate positions than original positions in the same area. As a result, searching complexity can be reduced with the reduced candidate positions.

As shown, each search widow 501A-501C is divided into multiple regions. Each search window 501A-501C has a first search region that is centered at a position of a current patch, and is concentrically surrounded by at least one other non-overlapping search region. In addition, the search regions located farther away from the position of the current patch has a lower subsample ratio.

Specifically, in FIG. 5A, the search grid 501A has a size of M×N, and is divided into three regions 510A-530A. The first region 510A is within a distance of N1 in the horizontal direction and a distance of M1 in the vertical direction with respect to the central position 502A. The second region 520A is outside of the first region 510A and within a distance of N2 in the horizontal direction and a distance of M2 in the vertical direction with respect to the central position 510A. The third region 530A is outside of the second region 520A. In addition, each region 510A-530A has a subsample ratio of 100%, 50%, or 25%, respectively. The region further from the central position 502A has a smaller subsample ratio.

In one example, the distances N1 equals N/4, and N2 equals N/2, while the distances M1 equals M/4, and M2 equals M/2. In various examples, the number or sizes of the regions can vary.

In FIG. 5B, the search pattern 500B includes three search regions 510B-530B each having a subsample ratio of 100%, 50%, or 25%. In FIG. 5C, the search pattern 500C includes three search regions 510C-530C each having a subsample ratio of 100%, 50%, or 25%. However, the sizes of the regions in FIGS. 5A-5C are different from each other.

Figure 6:
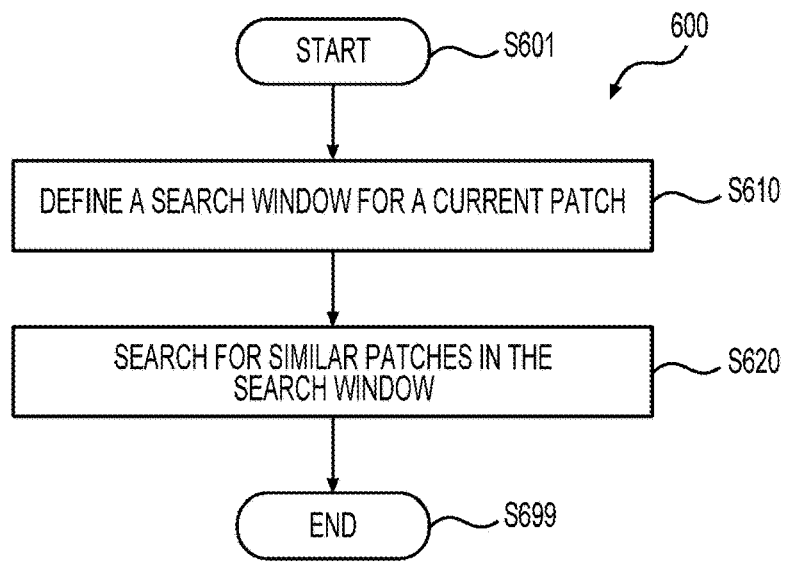
FIG. 6 shows a first process for searching for the K most similar reference patches for a current patch to form a patch group according to an exemplary embodiment of the disclosure.

FIG. 6 shows a first process 600 for searching for the K most similar reference patches for a current patch to form a patch group according to an exemplary embodiment of the disclosure. The process 600 is based on a search window similar to search windows defined in FIGS. 5A-5C. The process 600 can be used in the process 300 for denoising a reconstructed picture or slice. Specifically, the process 600 can be performed at S330 of the process 300 to search for the K most similar patches to form a patch group for each current patch obtained at S320. The process 600 starts from S601 and proceeds to S610.

At S610, a search window is defined for a current patch, for example, obtained at S320 of the process 300. The search window can be similar to the search windows 501A-501C. Specifically, the search window can have a first search region. The first region can be centered at a central position representing the current patch, and is concentrically surrounded by at least one other non-overlapping region. In addition, the search regions located further away from the central position have lower subsample ratios.

At S620, the K most similar reference patches of the current patch are found in the search window. The K most similar reference patches and the current patch can form a patch group. Taking the search window 501A in FIG. 5A as an example, the search operation can start from an initial candidate position and then goes through the other candidate positions. The initial candidate position can be any one of the candidate positions in the search window 501A. A first K candidate patches can be included in a candidate list and, for example, arranged in an order according to a similarity of each candidate reference patch with respect to the current patch. Subsequently, other candidate reference patches can be compared with the candidate patches in the candidate list in terms of similarity to the current patch. The one that is more similar to the current patch than a member of the candidate list can be included in the candidate list. The search operation can continue until all candidate reference patches in the search window have been examined.

During the above search operation, in one example, a similarity measurement, referred to as a similarity score, is derived for each candidate reference patch. The similarity score can be based on various similarity metrics. Assume a sum of absolute difference (SAD) is used for measuring the similarity between a reference patch and a current patch in a patch group. During a process of derivation of the similarity score, an absolute difference between each pair of pixels in a respective reference patch and a respective current patch is calculated and aggregated pixel by pixel. A partially derived similarity score, referred to as a partial similarity score, includes SADs of a portion of the total pixel pairs.

In one example, in order to reduce computation complexity, a deviation of a similarity score of a candidate reference patch is terminated earlier before a similarity score is fully calculated. For example, a threshold can be defined for early termination purpose. During a process of calculating a similarity measure for a candidate reference patch, a partially derived similarity measure can be compared with this threshold. When the partially derived similarity measure is greater than the threshold (meaning that the respective reference patch is too far from the current patch in terms of similarity), derivation of the similarity measure can be terminated. Accordingly, the respective candidate reference patch will not be included in the candidate list. Otherwise, the calculation will continue. In one example, the threshold is defined as a similarity score of one of the candidate reference patches included in the candidate list multiplied by a control parameter. The parameter can be a constant. The control parameter can be adjusted to control how early a derivation of a similarity measure is to be terminated.

While the scheme of early termination of a similarity deviation is described with reference to the process 600, the early termination scheme is not limited to the process 600. The early termination scheme can be applied in any search processes for searching for the K most similar reference patches in any denoising processes.

Figure 7:
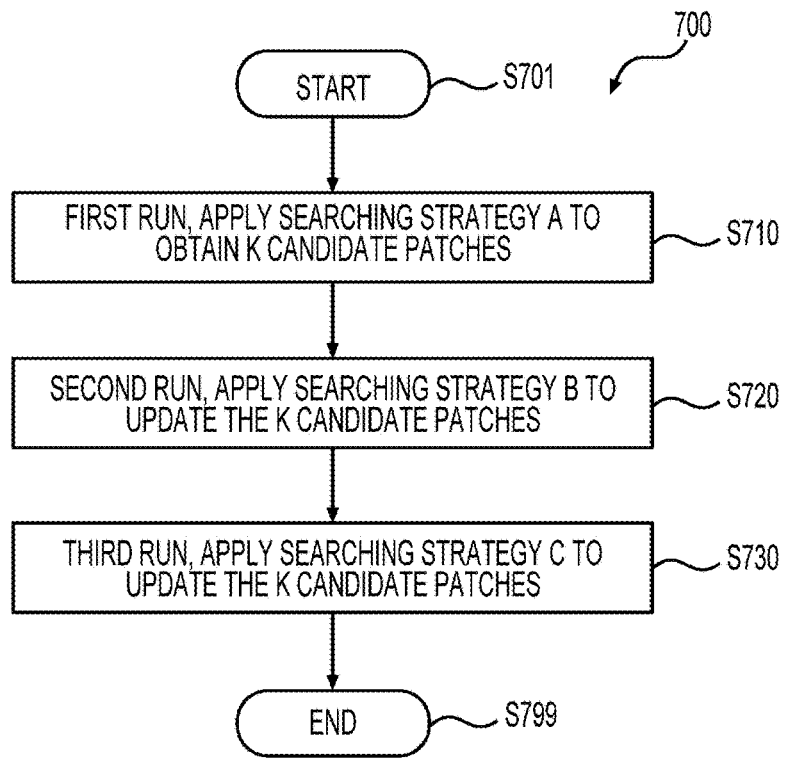
FIG. 7 shows a second process for searching for the K most similar reference patches for a current patch to form a patch group according to an exemplary embodiment of the disclosure.

FIG. 7 shows a second process 700 for searching for the K most similar reference patches for a current patch to form a patch group according to an exemplary embodiment of the disclosure. The process 700 combines at least two search strategies to search for the K most similar reference patches.

Because different search strategies may traverse different regions of a search grid around a current patch in a reconstructed picture or slice, the probability of finding the best candidate reference patches can be increased. The process 700 can be used in the process 300 for denoising a reconstructed picture or slice. Specifically, the process 700 can be performed at S330 of the process 300 to search for the K most similar patches to form a patch group for each current patch obtained at S320. The process 700 starts from S701 and proceeds to S710.

At S710, a first run of search is conducted. In the first run, a searching strategy A is applied to a search window to obtain the K most similar candidate reference patches of the respective current search patch. For example, the searching strategy of three step search is used for the first run. During the search process of the three step search, multiple candidate reference patches can be traversed. The first K traversed candidate reference patches can be included in a candidate list while performing the three step search. Thereafter, for each traversed candidate reference patch, a similarity of each traversed candidate reference patch to the respective current patch can be derived and compared with members of the candidate list. When a traversed candidate reference patch is found to be more similar than a number of the candidate list, the member of the candidate list can be substituted by this traversed candidate reference patch. In this way, the candidate list can continually updated when a better candidate reference patch is found from the traversed candidate reference patches.

At S720, a second run of search is conducted. In the second run, a searching strategy B is applied to a search window to update the best K candidate reference patches in the candidate list. The search window may have a size or shape the same or different from the search window in S710. For example, during the search process with the searching strategy B, multiple candidate positions in the search grid can be visited. Candidate reference patches at each of the visited candidate positions can be compared with members of the candidate list. When a traversed candidate reference patch is better than one on the candidate list, the one on the candidate list can be substituted by the traversed candidate reference patch.

At S730, a third run of search is conducted. In the third run, a searching strategy C is applied to a same or different search window to continue to update the best K candidate reference patches. Finally, an updated the best K reference patches can be obtained. For example, motion vectors corresponding to positions of the best K reference patches in the search window can be used to indicate the respective reference patches. The process 700 proceeds to S799, and terminates at S799.

In alternative examples, the number of runs of search can be fewer or greater than what is described above. The searching strategies can be one of full search, three step search, diamond search, four step search, hexagon-based search, 2D-log search, the search process 600, and the like. The searching strategies in different runs of search can be the same or different. In addition, an initial candidate position in the respective search grid in each run of search can be different or the same, or selected from results of a previous run of search (e.g., a position previously examined). Further, parameters of the search process 700 can be predefined, or signaled to a decoder in sequence level, picture level, slice level, or block level. The parameters can include a number of runs of search, an initial candidate position for each run of search, searching strategies corresponding to each run of search, and the like.

Figure 8:
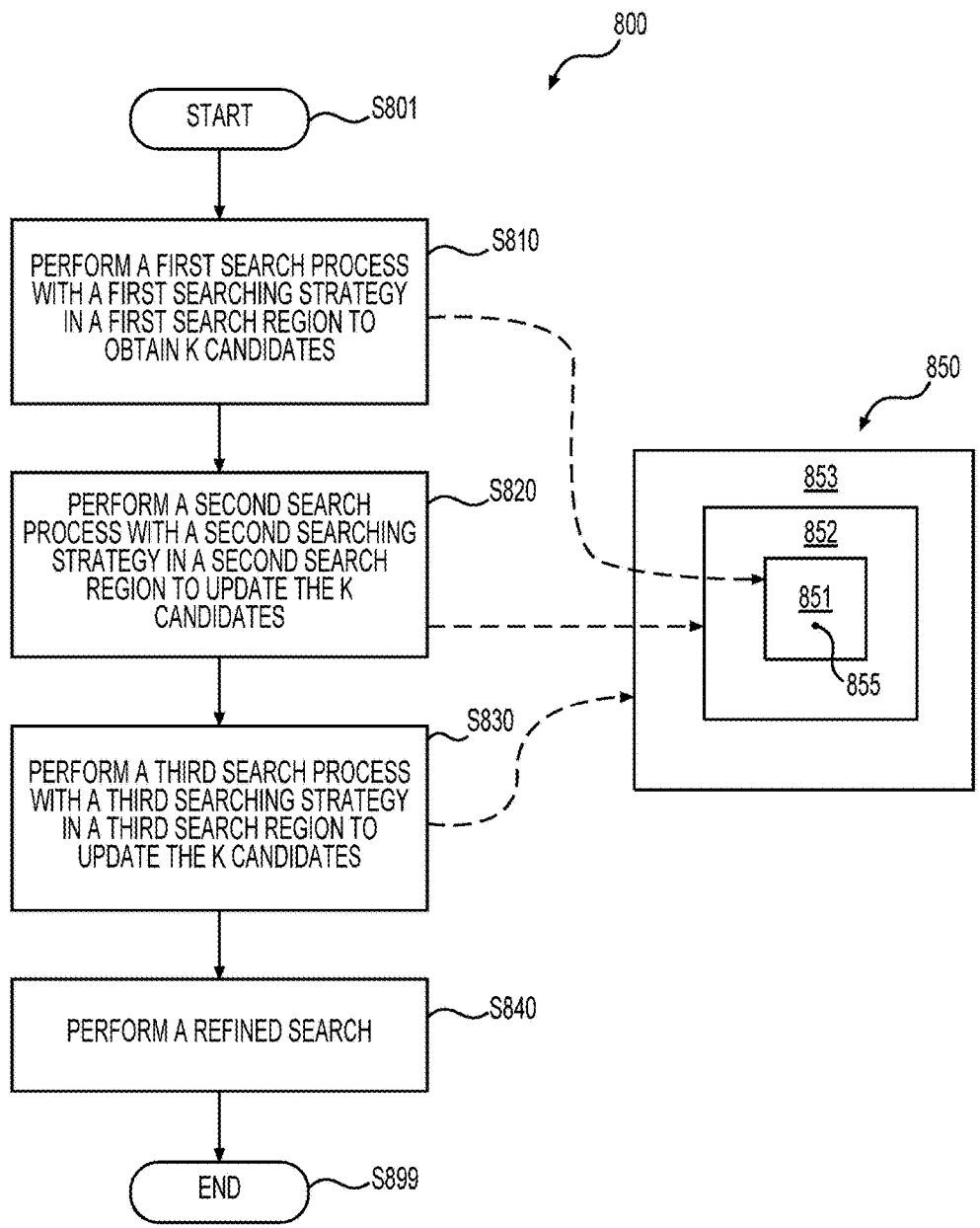
FIG. 8 shows a third process for searching for the K most similar reference patches for a current patch to form a patch group according to an embodiment of the disclosure.

FIG. 8 shows a third process 800 for searching for the K most similar reference patches for a current patch to form a patch group according to an embodiment of the disclosure. The process 800 can be used in the process 300 for denoising a reconstructed picture or slice. Specifically, the process 800 can be performed at S330 of the process 300 to search for the K most similar patches to form a patch group for each current patch obtained at S320. The process 800 is similar to the process 700, and combines at least two search strategies to search for the K most similar reference patches. However, the process 800 can include multiple rounds of sub-processes each performed on one of a sequence 850 of search regions 851-853.

As shown in FIG. 8, in one example, the sequence 850 of search regions 851-853 can be centered at a central position 855 corresponding to a position of the current patch in the patch group. In addition, the sequence of regions 851-853 can have different size, and a latter region includes and overlaps a previous region in the sequence of search regions 851-853. In one example, the sequence of search regions 851-853 each has a shape of square. In other examples, other shapes are possible. Further, different regions can have different subsample ratios. In one example, a region with a larger size has a smaller subsample ratio. In one example, the search regions 851-853 each have a subsample ratio of 1, 0.5, and 0.25.

The process 800 starts from S801 and proceeds to S810. At S810, a first search process is performed with a first searching strategy in the first region 851 to obtain the K most similar reference patches as candidates. In one example, the first searching strategy is a full search on the first region 851. At S820, a second search process is performed with a second searching strategy in the second region 852 to update the K candidates. At S830, a third search process is performed with a third searching strategy in the third region 853 to update the K most similar reference patches as candidates. As a result, an updated the K most similar reference patches are obtained.

At S840, a refined search is performed for each of the updated K patches. For example, a search region surrounding a position of each of the updated K patches can be searched to find a reference patch more similar to the current patch. The process 800 proceeds to S899, and terminates at S899. It is noted that the operation of a refined search can be performed in a last stage of any other search process (such as the process 600 and 700) for searching for the K most similar reference patches in any denoising processes.

In an alternative example, the process 800 can be performed on a sequence of search regions different from the sequence 850 of search regions 851-853. For example, a sequence of search regions 510A, 520A, and 530A in the search window 501A in FIG. 5A example can be searched using the process 800. Similarly, a sequence of search regions 510B, 520B, and 530B in the search window 501B, or a sequence of search regions 510C, 520C, and 530C in the search window 501C, can also be searched using the process 800.

Similar to FIG. 7 example, in alternative examples, the number of rounds of search in the process 800 can be fewer or greater than what is described above. The searching strategies can be one of full search, three step search, diamond search, four step search, hexagon-based search, 2D-log search, the search process 600, and the like. The searching strategies employed in different search processes can be the same or different. In addition, an initial candidate position in the respective search grid in each run of search can be different or the same, or selected from results of a previous run of search (e.g., a position previously examined). Further, parameters of the search process 800 can be predefined, or signaled to a decoder in sequence level, picture level, slice level, or block level. The parameters can include parameters of search region configurations, a number of rounds of search, an initial candidate position for each round of search, searching strategies corresponding to each round of search, and the like.

In various examples, searching results of one color components in the search processes 600, 700, and 800, or other searching techniques can be reused for other color components. For example, during the denoising process 300, the reconstructed video data received at S310 can include more than one color components, for example, one luma component and two chroma components. Sample arrays corresponding to different color components can form different reconstructed pictures or slices. At S320 in the process 300, when reconstructed video data is divided into non-overlapped current patches, each current patch can include different color components. In other words, samples of different color components corresponding to one current patch can form different current patches, referred to as component current patches, such as a luma current patch or a chroma current patch.

Accordingly, at S340, searching for the K most similar patches is performed for each component current patch, such as a luma or chroma current patch. At this stage, search results of one color component can be reused for another color component. For example, after the K most similar reference patches have been found and determined for a luma current patch, position information, such as motion vectors corresponding to the K most similar luma reference patches, can be reused for determine similar chroma reference patches for a chroma current patch corresponding to the luma current patch.

Figure 9:
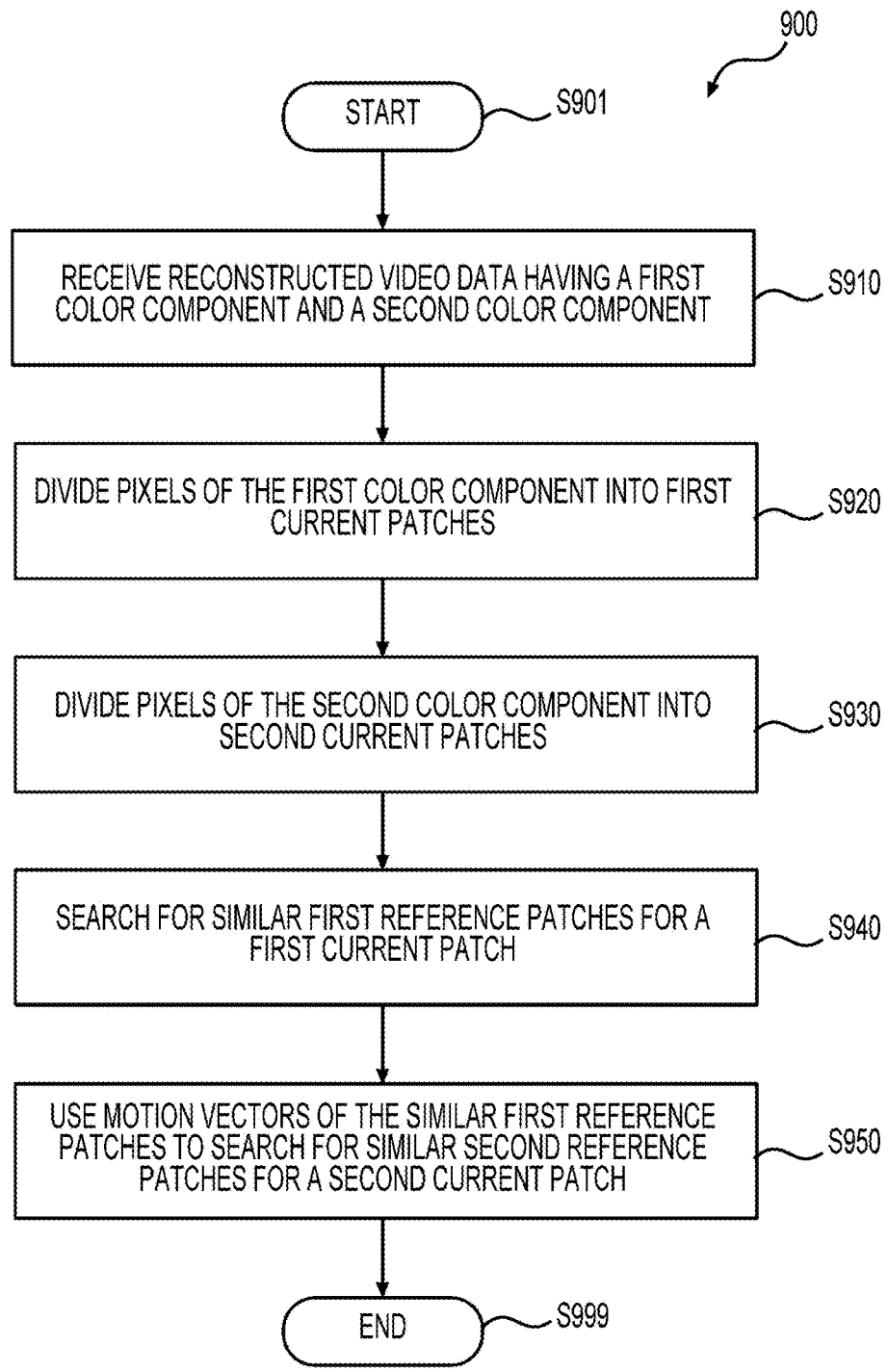
FIG. 9 shows a process for reusing search results of a first color component to search for similar reference patches and form patch groups for a second color component according to an embodiment of the disclosure.

FIG. 9 shows a process 900 for reusing search results of a first color component to search for similar reference patches and form patch groups for a second color component according to an embodiment of the disclosure. The process 900 starts from S901 and proceeds to S910.

At S910, reconstructed data is received. The reconstructed data corresponds to a reconstructed picture having first and second color components, such as a luma component, and a chroma component.

At S920, pixels of the first color component in the reconstructed picture are divided into first current patches. Each first current patch includes pixels corresponding to the first color component.

At S930, pixels of second color component in the reconstructed picture are divided into second current patches. Each second current patch includes pixels corresponding to the second color components.

At S940, similar first reference patches are found for corresponding first current patches to form first patch groups. For example, as a result, for each first patch group, motion vectors indicating positions of the similar first reference patches with respect to a corresponding current patch can be obtained.

At S950, position information, such as the motion vectors, resultant from S940 can be used for searching for similar second reference patches for the respective second current patches to form second patch groups. Depending on a format of the reconstructed picture, the ways of using the motion vectors of the first color component for the second color component can be different.

Specifically, in a first example, the reconstructed video data includes a luma component and a chroma component. The luma and chroma components have a same sampling ratio (such as in a picture format of YUV 444). In addition, the partitions of the luma and chroma current patches are performed in a same way. As a result, each luma patch corresponds to a chroma patch having a same shape and a same size (in terms of a number of samples within each patch). Accordingly, positions indicated by motion vectors of the similar luma reference patches of a luma current patch can be reused as positions of the similar chroma reference patches for a corresponding chroma current patch. Searching for similar chroma reference patches can thus be avoided for the second color component.

In a second example, similar to the first example, the reconstructed video data includes a luma component and a chroma component that have a same sampling ratio. Partitions of the luma and chroma current patch are the same, and each luma patch corresponds to a chroma patch having a same size and shape. After the similar chroma reference patches corresponding to a chroma current patch is determined, a refined search can be performed around each position of the already found chroma reference patches to determine a most similar chroma reference patch for a corresponding chroma current patch. For example, each refined search is performed within a searching region around a position of one of the already found first component reference patches. As a result, a cost of searching for similar chroma reference patches can thus be reduced.

In a third example, color components in reconstructed video data have different sampling ratios, for example, a reconstructed picture has a format of YUV420, or YUV 422. Assume the corresponding reconstructed picture has a format similar to YUV 420, and includes a luma component and a chroma component. Accordingly, the chroma component in the reconstructed picture is subsampled having a sampling ratio of 0.5 in both the vertical and horizontal directions. In addition, in this example, partitions of the luma component and the chroma component can be performed in a similar way such that numbers of the luma or chroma current patches can be the same, and each luma current patch corresponds to a chroma current patch. Each pair of luma and chroma current patches can have a similar shape but include different number of pixels.

In this scenario, for example, in order to reuse motion vectors of luma reference patches, a patch size (in terms of pixel numbers) of the chroma current patch and corresponding reference patches collocated with the corresponding luma patches can be scaled according to the corresponding sampling ratio. For example, when a luma patch size is 8×8, a chroma patch size can be defined as 4×4 accordingly for forming patch groups. Thereafter, in order to reuse motion vectors of luma reference patches for chroma reference patches, scaling operations can be performed on the motion vectors of luma component according to the sampling ratios of different color components. For example, a motion vector including a pair of coordinates (x, y) can be scaled to obtain a scaled motion vector having a pair of coordinates of (x/2, y/2) according to the above chroma sampling ratio of 0.5. Accordingly, rounding offset or direct truncation can be used for scaling the motion vectors.

The obtained scaled motion vectors can then be used in a search grid corresponding to a chroma current patch to indicate positions of candidate chroma reference patches. Specifically, scaled motion vectors corresponding to luma reference patches in a luma patch can be directly used for locating chroma reference patches for a corresponding chroma patch group without performing any search. Alternatively, in another example, a refined search can be performed in a region around a position indicated by a scaled motion vector to determine a most similar chroma reference patch in this region. This most similar chroma reference patch in this region can be included in the corresponding chroma patch group.

In a fourth example, the reconstructed video data having different sampling ratios for different color components, and a patch size (in terms of pixel numbers) of a chroma component may be kept the same as that of the luma component. Accordingly, a chroma current patch with a size of 8×8 may overlap four luma current patches each with a size of 8×8, for example, for the format of YUV 420, in a corresponding reconstructed picture. Accordingly, searching for the similar chroma reference patches of the chroma current patch can be performed at positions of the similar luma reference patches of those four current luma patches. Searching complexity can also be reduced.

For example, after motion vectors of luma reference patches of luma patches have been determined, a scaling operation according to the sampling ratio of a chroma component can be performed to the motion vectors to obtain scaled motion vectors. Assume each chroma current patch overlaps four luma current patches as in a reconstructed picture having the YUV 420 format. Similar chroma reference patches corresponding to a chroma current patch can be found from candidate chroma reference patches indicated by the scaled motion vectors corresponding to the four luma current patches overlapping the chroma current patch.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving reconstructed video data corresponding to a picture;
   dividing the picture into current patches;
   forming patch groups each including a current patch and a number of reference patches that are similar to the current patch;
   denoising the patch groups to modify pixel values of the patch groups to create a filtered picture, wherein denoising the patch groups includes deriving a variance of compression noise in the respective patch group based on a compression noise model in which a standard deviation (SD) of compression noise in the respective patch group is a function of a SD of pixel values of the respective patch group, and the function is represented as a polynomial function; and
   generating a reference picture based on the filtered picture for encoding or decoding a picture.

2. The method of claim 1, wherein the coefficients of the polynomial function is determined based on coding unit level information that includes one or a combination of:
   a quantization parameter (QP) of a coding unit associated with the respective current patch in the respective patch group, and
   a prediction type of the coding unit associated with the respective current patch in the respective patch group.

3. The method of claim 2, wherein the coding unit level information further includes:
   one or more QPs of predictions of the coding unit, wherein,
   when there is a non-zero residue in the coding unit, the QP of the coding unit is used to determine the model parameters, and
   when there is no residue in the coding unit, an average between the QP of the coding unit and the one or more QPs of the predictions of the coding unit is used to determine the model parameters.

4. The method of claim 1, wherein applying the denoising technology includes:
   calculating a weighting factor for each reference patch based on a similarity between each reference patch and the current patch, the weighting factors of each reference patch being derived based on an expression, $e^{-(SSE/Var)}$, where SSE represents an average of a sum of square error between the current patch and the respective patch, and Var represents the variance of compression noise in the respective patch group, and
   piece-wise linear interpolation is used to approximate a value of the expression, $e^{-(SSE/Var)}$, for calculating the respective weighting factor.

5. The method of claim 1, wherein
   a clipping operation is applied on the SD of compression noise in the respective patch group or the SD of pixel values of the respective patch group to guarantee a monotonic increase property of the polynomial function.

6. A method, comprising:
   receiving reconstructed video data corresponding to a picture;
   dividing the picture into current patches;
   searching for K similar reference patches in the picture for each of the current patches to form a patch group including the K similar reference patches and the respective current patch, the K similar reference patches being searched for within a predefined search window in the picture,
   wherein searching for the K similar reference patches includes,
      performing a first search process using a first searching strategy to obtain K similar patches included in a candidate list, and
      performing a second search process using a second searching strategy to update the candidate list,
      wherein a candidate reference patch that is traversed by the second search process and more similar to the current patch than a first member of the candidate list is added to the candidate list, and the first member is removed from the candidate list;
   denoising the patch groups to modify pixel values of the patch groups to create a filtered picture; and
   generating a reference picture based on the filtered picture for encoding or decoding a picture.

7. The method of claim 6, wherein performing a first search process using a first searching strategy to obtain the K similar patches includes:
   traversing candidate reference patches by using the first searching strategy;
   including the first K traversed candidate reference patches in the candidate list while performing the first searching strategy; and
   including a candidate reference patch that is traversed by the first search process and more similar to the current patch than a second member of the candidate list to the candidate list, and removing the second member from the candidate list.

8. The method of claim 6, wherein the first searching strategy and the second searching strategy employ different search algorithms such that candidate locations traversed by the first search process are not fully included in that traversed by the second search process, and candidate locations traversed by the second search process are not fully included in that traversed by the first search process.

9. The method of claim 6, wherein the first or second searching strategy employs one of full search, three step search, diamond search, four step search, hexagon-based search, or 2-dimensional-log search.

10. The method of claim 6, wherein an initial candidate reference patch of the first search process is different from, or the same as an initial candidate reference patch of the second search process.

11. The method of claim 6, wherein an initial candidate reference patch of the second search process is one of the candidate reference patches traversed by the first search process.

12. The method of claim 6, wherein
the search window having a first search region that is centered at a position of the respective current patch and that is concentrically surrounded by at least one other non-overlapping search region, wherein among the first search region and the at least one other non-overlapping search region, the search region located farther away from the position of the respective current patch has a lower subsample ratio.

13. The method of claim 12, wherein each search region is of a rectangular shape.

14. The method of claim 6, wherein searching for the K similar reference patches further includes:
when searching for the K similar reference patches for each current patch, terminating derivation of a first similarity measure of a candidate reference patch when the partially derived first similarity measure of the candidate reference patch is greater than a threshold equal to a second similarity measure of one of K previously-found similar reference patches multiplied by a control parameter.

15. The method of claim 6, wherein the first search process is performed in a first search region centered at a position of the current patch on a search grid, and the second search process is performed in a second search region concentric with the first search region, wherein the second search region includes the first search region, and the second search region and the first search region have different subsample ratios.

16. The method of claim 6, wherein the first search process is performed in a first search region centered at a position of the current patch on a search grid, and the second search process is performed in a second search region concentric with the first search region, wherein the second search region surrounds the first search region, and the second search region and the first search region have different subsample ratios.

17. The method of claim 6, wherein searching for the K similar reference patches further includes:
performing a refined search in a region around a position of a reference patch on the updated candidate list.

18. The method of claim 6, wherein a number of search processes including at least the first and second search processes for searching for the K similar reference patches and corresponding search strategies are predefined, or signaled at sequence level, picture level, slice level, or block level.

19. A method, comprising:
receiving reconstructed video data corresponding to a picture having a first color component and a second color component;
dividing pixels of the first color component in the picture into first current patches;
dividing pixels of the second color component in the picture into second current patches;
searching for first reference patches of the first color component in the picture that are similar to the respective first current patch to form a first patch group of the first color component that includes the respective first current patch and the first reference patches that are similar to the respective first current patch;
obtaining motion vectors indicating positions of the first reference patches of the first color component with respect to the respective first current patch;
using the obtained motion vectors of the first reference patches of the first patch group of the first color component to search for second reference patches of the second color component in the pixels of the second color component that are similar to the respective second current patch to form a second patch group of the second color component that includes the respective second current patch and the second reference patches that are similar to the respective second current patch,
wherein when the first and second color components have a same sampling ratio, and each first current patch corresponds to one of the second current patches, a refined search is performed on a search region of the pixels of the second color component surrounding a position indicated by one of the obtained motion vectors with respect to the respective second current patch to determine one of the second reference patches of the second patch group; and
denoising the first patch group of the first color component, and the second patch group of the second color component.

20. The method of claim 19, wherein the first and second color components have a same sampling ratio, and each first current patch corresponds to one of the second current patches, and
using the obtained motion vectors of the first reference patches of the first patch group to search for the second reference patches includes:
using the motion vectors of the first reference patches of the first patch group as motion vectors of the second reference patches of the second patch group.

21. The method of claim 19, wherein the first color component and the second color component have different sampling ratios, and each first current patch corresponds to one of the second current patches, and
using the obtained motion vectors of the first reference patches of the first color component to search for the second reference patches of the second color component includes:
performing a scaling operation according to the different sampling ratios to the motion vectors of the first reference patches of the first patch group to obtain scaled motion vectors; and
using the scaled motion vectors as motion vectors of the second reference patches of the second patch group.

22. The method of claim 19, wherein the first color component and the second color component have different sampling ratios, and each first current patch corresponds to one of the second current patches, and using the obtained motion vectors of the first reference patches of the first color component to search for the second reference patches of the second color component includes:
  performing a scaling operation according to the different sampling ratios to the motion vectors of the first reference patches of the first patch group to obtain scaled motion vectors; and
  performing a refined search on a search region of the pixels of the second color component surrounding a position indicated by one of the scaled motion vectors to determine one of the second reference patches of the second patch group.

23. The method of claim 19, wherein the first color component and the second color component have different sampling ratios, and each second current patch corresponds to multiple first current patches, and
using the obtained motion vectors of the first reference patches of the first color component to search for the second reference patches of the second color component includes:
  performing a scaling operation according to the different sampling ratios to the motion vectors of the first reference patches of the first patch group to obtain scaled motion vectors; and
  searching for the second reference patches from candidate second reference patches at positions indicated by the scaled motion vectors.

* * * * *